US011994059B2

(12) United States Patent
Verdoorn

(10) Patent No.: US 11,994,059 B2
(45) Date of Patent: May 28, 2024

(54) ELECTRIC EXHAUST TURBOCHARGER

(71) Applicant: Dr. Ing. h.c. F. Porsche Aktiengesellschaft, Stuttgart (DE)

(72) Inventor: Werner Verdoorn, Ludwigsburg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/203,087

(22) Filed: May 30, 2023

(65) Prior Publication Data
US 2024/0026812 A1    Jan. 25, 2024

(51) Int. Cl.
*F02B 39/10*    (2006.01)
*F02B 33/40*    (2006.01)

(52) U.S. Cl.
CPC .............. *F02B 39/10* (2013.01); *F02B 33/40* (2013.01)

(58) Field of Classification Search
CPC ......... F02B 37/10; F02B 39/14; F02B 39/005
See application file for complete search history.

(56) References Cited

U.S. PATENT DOCUMENTS

| 7,025,579 B2 | 4/2006 | Woollenweber et al. |
| 11,542,958 B2 | 1/2023 | Scholz et al. |
| 2022/0416607 A1* | 12/2022 | Fedorikhin ............. F02B 37/12 |

FOREIGN PATENT DOCUMENTS

DE    102012206304 A1 * 10/2013 ............. F01D 25/16

OTHER PUBLICATIONS

Machine generated translation of the Description of DE102012206304A1 obtained from espacenet on Nov. 8, 2023 (Year: 2023).*
German Search Report dated Mar. 7, 2023.

* cited by examiner

*Primary Examiner* — Ngoc T Nguyen
(74) *Attorney, Agent, or Firm* — Gerald E. Hespos; Michael J Porco

(57) ABSTRACT

An electric exhaust turbocharger (10) has a turbine wheel (12), a compressor wheel (14) that is non-rotatably connected to the turbine wheel (12), and an electric drive motor having a stator (30) and a rotor (54). The rotor (54) is fixed to a rotor shaft (52) and is connected non-rotatably to the turbine wheel (12) and the compressor wheel (14) via the rotor shaft (52). The rotor (54) is arranged axially between the turbine wheel (12) and the compressor wheel (14) on the rotor shaft (52). Roller bearings (60, 60') are arranged between the rotor (54) and the turbine wheel (12) on the one hand and between the rotor (54) and the compressor wheel (14) on the other hand. A single separate shaft bearing cassette (40) with a cassette frame (71) supports the two roller bearings (60, 60').

8 Claims, 2 Drawing Sheets

ELECTRIC EXHAUST TURBOCHARGER

CROSS REFERENCE TO RELATED APPLICATION

This application claims priority on German Patent Application No 10 2022 118 325.4 filed Jul. 21, 2022, the entire disclosure of which is incorporated herein by reference.

BACKGROUND

Field of the Invention. The invention relates to an electric exhaust turbocharger having a turbine wheel, a compressor wheel that is non-rotatably connected to and driven by the turbine wheel, and a drive motor that can be connected as needed.

Related Art U.S. Pat. No. 7,025,579 B2 discloses an electric exhaust turbocharger with an electric drive motor arranged on an end of the rotor shaft. The electric drive motor represents a flow obstacle on the suction side of the compressor wheel. Both the rotor shaft of the fluidic segment of the exhaust turbocharger and the motor shaft are supported with two bearings each. These bearings must be designed for speeds above 200,000 rpm, so that the overall bearing requirement is very high.

Accordingly, an object of the invention is to create a simply structured and fluidically efficient electric exhaust turbocharger with high bearing quality and low bearing requirements.

SUMMARY OF THE INVENTION

The invention relates to an electric exhaust turbocharger that comprises a turbine wheel, a compressor wheel that is non-rotatably connected to the turbine wheel, and an electric drive motor axially arranged between the turbine wheel and the compressor wheel. The electric drive motor includes a motor stator and a motor rotor. The motor rotor is fixed non-rotatably to a rotor shaft, and is connected non-rotatably to the turbine wheel and to the compressor wheel via the rotor shaft. The motor rotor, the turbine wheel, the compressor wheel and the rotor shaft thus form a single rotor.

The motor rotor is axially arranged between the turbine wheel and the compressor wheel on the rotor shaft. The motor rotor preferably is arranged axially so that it is approximately centered between the two roller bearings. The axial bearing arrangement of the entire rotor is accomplished by a first roller bearing between the motor rotor and the turbine wheel, and a second roller bearing between the motor rotor and the compressor wheel.

A separate shaft mounting cassette is provided with a cassette frame that supports the two roller bearings. The motor rotor therefore is arranged in the axial center of the cassette frame so that imbalances of the motor rotor are supported symmetrically by the roller bearings. Moreover, the overall structure of the rotor, including the turbine wheel and the compressor wheel, is largely symmetric. Thus, the entire rotor can be supported with only two roller bearings. Moreover, separately manufactured cassette frame, in particular regarding the rotational bearing support of the rotor, the tolerance chains are kept short, which has a positive effect on wear, fluid sealing and manufacturing costs.

The motor rotor is preferably permanently magnetic, thereby realizing a brushless drive engine that is commutated electronically. The cassette frame preferably is made of a non-ferromagnetic material, such as aluminum or another non-magnetic metal alloy or a ceramic. This has the advantage that a non-ferromagnetic cassette frame material can reduce a distance between the drive motor and the bearings. Accordingly, it is possible to mount a longer rotor of the drive motor in the same installation space to increase performance or reduce the installation space requirement. The cassette frame surrounds the motor rotor. Thus, the non-ferromagnetic cassette frame ensures that the electromagnetic interaction between the motor rotor and the motor stator is affected only by the cassette frame to a very low degree or not at all.

The cassette frame of some embodiments comprises two end bearing segments, each supporting a roller bearing, and a motor segment with a grid structure is provided between the two bearing segments in the area of the motor rotor. The grid structure provides a rigid connection of the two, preferably largely cylindrical, bearing segments and allows for electromagnetic coupling of the motor stator and motor rotor with the least possible resistance and loss. The grid structure may define a substantially cylindrical envelope.

The grid structure of some embodiments is formed in the cassette frame engine segment by substantially axially extending grid bars. The grid bars preferably are aligned precisely in the axial direction.

The number of grid bars extending between the two bearing segments preferably corresponds to the number of stator poles defined by the motor stator. The motor stator of some embodiments has engine coil supporting stator bodies forming a plurality of pole shoes. The pole shoes form the magnetic stator poles and are circumferentially arranged between the grid bars and in the cylinder plane of the grid bars. Accordingly, one pole shoe is arranged between every two grid bars. In this way, the pole shoes can be positioned radially very close to the engine rotor, so that the electromagnetic losses caused by the cylindrical air gap between the engine stator and the engine rotor are kept low.

The cassette frame of some embodiments is constructed in two sections, and is formed by a one-piece main frame section and a one-piece end frame section. The main frame section forms a first bearing segment and the grid structure. The end frame section forms the second bearing segment.

The inner shell and/or the outer shell of at least one roller bearing may be formed directly from the rotor shaft or directly from the cassette frame, thereby reducing the number of components and shortening the tolerance chain.

A separate charger housing that directly supports the motor stator and the shaft bearing cassette is provided in some embodiments. The charger housing is not necessarily fully closed, but shields the motor stator, the motor rotor and the two roller bearings towards the outside in an approximately gas-tight manner.

The invention is explained in further detail in the following with reference to the drawings.

DETAILED DESCRIPTION

Figure 1:
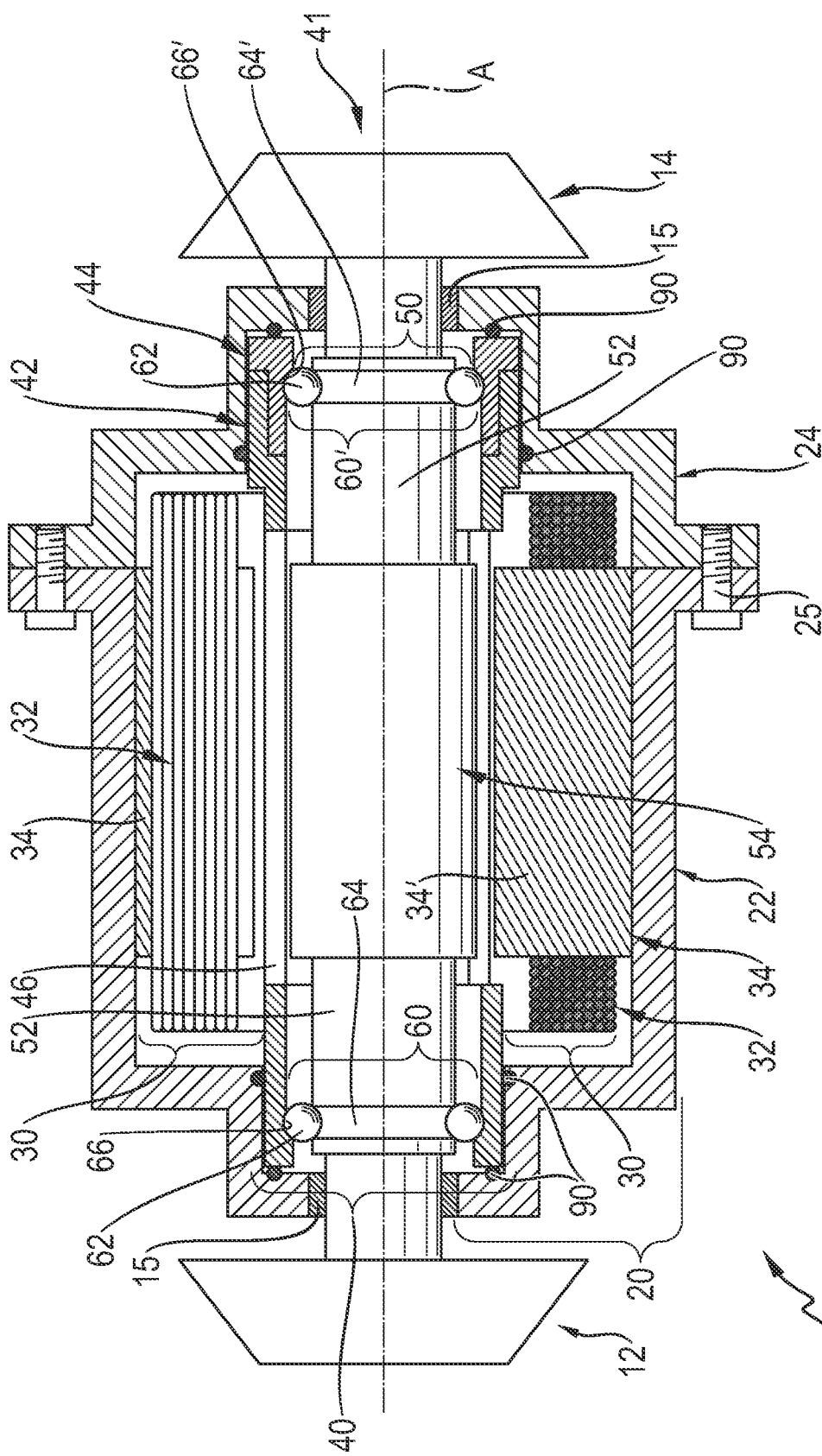
FIG. 1 is a schematic longitudinal section of an electric exhaust turbocharger having a separately formed shaft bearing cassette.

FIG. 1 shows a longitudinal section of an electric exhaust turbocharger 10 that is symmetrically structured in such a manner that the electric drive motor is axially arranged and approximately centered between a turbine wheel 12 and a compressor wheel 14. The exhaust turbocharger 10 is designed for speeds up to 250,000 rpm, so that high demands are placed on the accuracy of the rotor bearing to ensure long run times.

The exhaust turbocharger rotor 41 rotates about a rotor axial A and has of a rotor shaft 52 on which a permanently magnetic motor rotor 54 is axially arranged and approximately centered with the turbine wheel 12 on the drive side and the compressor wheel 14 on the compressor side. All of the aforementioned segments of the exhaust turbocharger rotor 41 are non-rotatably connected to each other.

The rotor shaft 52 is part of a shaft bearing cassette 40 having a two-piece cassette frame 71 that supports two roller bearings 60, 60'. A first roller bearing 60 is arranged axially between turbine wheel 12 and the motor rotor 54, and a second roller bearing 60' is axially arranged between the engine rotor 54 and the compressor wheel 14. The two-piece cassette frame 71 has two end bearing segments 70, 74, and each supports one of the roller bearings 60, 60'. A motor segment 72 is between the two end bearing segments 70, 74 and has a grid structure in the form of precisely axially oriented grid bars 46 rigidly connecting the two bearing segments 70, 74. The cassette frame 71 is made of a non-ferromagnetic metal, such as aluminum.

The drive motor includes an annular engine stator 30 that essentially comprises a punch-packed stator body 34 and motor coils 32 supported by the stator body 34. The stator body 34 forms pole shoes 34' that form the electromagnetic stator poles and, when viewed circumferentially, are arranged in the spaces between the grid bars 46. The number of pole shoes 34' therefore corresponds exactly to the number of grid bars 46. In this way, the pole shoes 34' protrude radially close to the engine rotor 54 such that the electromagnetic air gap between the motor rotor 54 and the motor stator 30 can be kept small.

The cassette frame 71 has two sections, namely, a one-piece main frame segment 42 and a one-piece end frame segment 44. The one-piece main frame segment 42 comprises a first bearing segment 70 and the grid bars 46 of the grid structure. The one-piece end frame segment 44 forms the second bearing segment 74. The cassette frame 71 has ring grooves 90' facing radially outward at its longitudinal ends, and elastic O-rings 90 are seated in the ring grooves 90'. The cassette frame 71 is supported indirectly over the ring grooves 90' in a separate charger housing 20.

The charger housing 20 is formed in two parts and comprises a pot-like main housing 22 and a housing cover 24. The pot-like main housing 22 encloses the first bearing segment 70 and the motor segment 72, and the housing cover 24 substantially encloses the second bearing segment 74. The main housing 22 and the housing cover 24 have a fluid-tight connection to each other via a flange connection with threaded screws 25.

Figure 2:
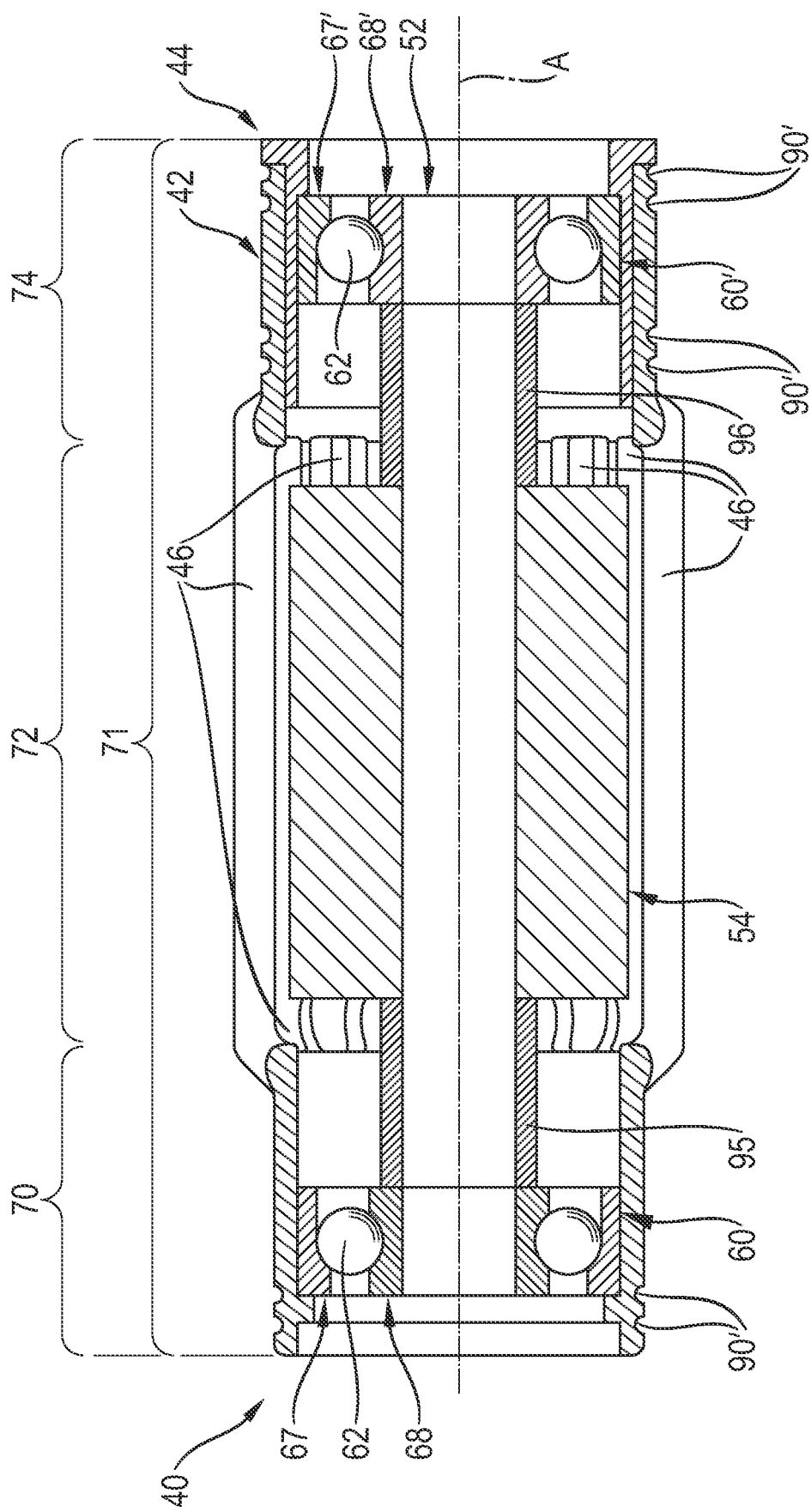
FIG. 2 is an enlarged longitudinal section of the shaft bearing cassette of FIG. 1.

The two roller bearings 60, 60' can be integrated or formed independently. In the embodiment shown in FIG. 1, for both integral bearings 50, the inner raceway 64, 64' is formed from the rotor shaft 52 and the corresponding outer raceway 66, 66' is formed from the main frame section 42 and the end frame section 44 itself. In the embodiment shown in FIG. 2, independent roller bearings that comprise a separate outer shell 67, 67' and inner shell 68, 68' are installed. The roller bearings 60, 60' of both embodiments are ball bearings with bearing balls 62. A spacer sleeve 95, 96 is arranged between the inner roller bearing shell 68, 68' and the motor rotor 54.

The two ring gaps between the shaft ends of the turbine wheel 12 and the compressor wheel 14 on the one hand and the corresponding opening edges of the shaft openings of the charger housing 20 are sealed in a fluid-tight manner by dynamic shaft seals 15 that prevent the penetration of combustion gases on the side of the compressor wheel 14 into the charger housing interior.

The invention claimed is:

1. An electric turbocharger (10) comprising: a turbine wheel (12), a compressor wheel (14) that is non-rotatably connected to the turbine wheel (12), and an electric drive motor having a stator (30) and a rotor (54), the rotor (54) being fixed to a rotor shaft (52), and being connected non-rotatably to the turbine wheel (12) and the compressor wheel (14) via the rotor shaft (52), the rotor (54) being arranged axially between the turbine wheel (12) and the compressor wheel (14) on the rotor shaft (52), a first roller bearings (60) being arranged between the rotor (54) and the turbine wheel (12), and a second roller bearings (60') being arranged between the rotor (54) and the compressor wheel (14), and a single separate shaft bearing cassette (40) with a cassette frame (71) supporting the first and second roller bearings (60, 60'), wherein the cassette frame (71) comprises first and second bearing segments (70, 74) respectively supporting the first and second roller bearings (60, 60'), and a motor segment (72) having a grid structure extending between the first and second bearing segments (70, 74).

2. The electric exhaust turbocharger (10) of claim 1, wherein the motor segment (72) of the cassette frame (71) comprises substantially axially oriented grid bars (46) connecting the first and second bearing segments (70, 74).

3. The electric exhaust turbocharger (10) of claim 2, wherein the engine stator (30) comprises: a stator body (34), coils (32) supported by the stator body (34) and pole shoes (34') arranged in spaces between the grid bars (46), the pole shoes (34') forming electromagnetic stator poles of the stator (30).

4. The electric exhaust turbocharger (10) of claim 1, wherein the cassette frame (71) is non-ferromagnetic.

5. The electric exhaust turbocharger (10) of claim 1, further comprising a separate charger housing (20) supporting the stator (30) and the shaft mounting cassette (40).

6. The electric exhaust turbocharger (10) of claim 1, wherein the rotor (54) is permanently magnetically formed.

7. An electric exhaust turbocharger (10) comprising: a turbine wheel (12), a compressor wheel (14) that is non-rotatably connected to the turbine wheel (12), and an electric drive motor having a stator (30) and a rotor (54), the rotor (54) being fixed to a rotor shaft (52), and being connected non-rotatably to the turbine wheel (12) and the compressor wheel (14) via the rotor shaft (52), the rotor (54) being arranged axially between the turbine wheel (12) and the compressor wheel (14) on the rotor shaft (52), first respective roller bearings (60) being arranged between the rotor (54) and the turbine wheel (12), and second roller bearings (60') being arranged between the rotor (54) and the compressor wheel (14), and a single separate shaft bearing cassette (40) with a cassette frame (71) supporting the first and second roller bearings (60, 60'), wherein the cassette frame (71) is comprised of a one-piece main frame section (42) and a one-piece end frame segment (44), the one-piece main frame section (42) forming a first bearing segment (70) and a grid structure, and the one-piece end frame segment (44) forming a second bearing segment (74), the grid structure extending between the first and second bearing segments (70, 74).

8. An electric exhaust turbocharger (10) comprising: a turbine wheel (12), a compressor wheel (14) that is non-rotatably connected to the turbine wheel (12), and an electric drive motor having a stator (30) and a rotor (54), the rotor (54) being fixed to a rotor shaft (52), and being connected non-rotatably to the turbine wheel (12) and the compressor wheel (14) via the rotor shaft (52), the rotor (54) being arranged axially between the turbine wheel (12) and the compressor wheel (14) on the rotor shaft (52), first respective roller bearings (60) being arranged between the rotor (54) and the turbine wheel (12), and second roller bearings (60') being arranged between the rotor (54) and the compressor wheel (14), and a single separate shaft bearing cassette (40) with a cassette frame (71) supporting the first and second roller bearings (60, 60'), wherein at least one of the first and second roller bearings (60, 60') is formed directly on the rotor shaft (52) or directly on the cassette frame (71).

\* \* \* \* \*